(12) United States Patent
Tsukamoto et al.

(10) Patent No.: US 8,679,666 B1
(45) Date of Patent: Mar. 25, 2014

(54) PACKAGING WITH TERMINAL FOR MULTIPLE BATTERY POWER SYSTEM

(75) Inventors: Hisashi Tsukamoto, La Canada Flintridge, CA (US); Mikito Nagata, Saugus, CA (US); Michael Tomcsi, Granada Hills, CA (US); Aaron Castillo, Castaic, CA (US); Alex Pal, Montrose, CA (US); Joice Yi, Granada Hills, CA (US); Zarui Sara Chikneyan, Glendale, CA (US)

(73) Assignee: Quallion LLC, Sylmar, CA (US)

( * ) Notice: Subject to any disclaimer, the term of this patent is extended or adjusted under 35 U.S.C. 154(b) by 579 days.

(21) Appl. No.: 12/589,912

(22) Filed: Oct. 29, 2009

(51) Int. Cl.
*H01M 2/10* (2006.01)

(52) U.S. Cl.
USPC ............... 429/99; 429/96; 429/151; 429/155; 429/160

(58) Field of Classification Search
USPC ............................... 429/96, 99, 151, 155, 160
See application file for complete search history.

(56) References Cited

U.S. PATENT DOCUMENTS

| 6,811,921 B2 * | 11/2004 | Dansui et al. | 429/99 |
| 2007/0264562 A1 * | 11/2007 | Kang et al. | 429/96 |
| 2010/0247979 A1 * | 9/2010 | Ha et al. | 429/7 |

FOREIGN PATENT DOCUMENTS

| DE | 202006008476 U1 * | 9/2006 | H01M 10/441 |
| WO | WO 2008035873 A1 * | 3/2008 | H01M 14/00 |

* cited by examiner

*Primary Examiner* — Zachary Best
(74) *Attorney, Agent, or Firm* — Gavrilovich, Dodd & Lindsey, LLP

(57) ABSTRACT

The battery pack includes a case that contains batteries and includes terminals through which power from the batteries can be accessed. The battery pack also includes a frame that defines battery receiving compartments that are each configured to receive one of the batteries with the frame immobilizing the position of each battery relative to the other batteries. The frame has a perimeter and at a portion of the frame perimeter serves as an outermost wall of the case.

27 Claims, 6 Drawing Sheets

US 8,679,666 B1

PACKAGING WITH TERMINAL FOR MULTIPLE BATTERY POWER SYSTEM

FIELD

The present invention relates to power sources and more particularly to batteries and hybrid batteries.

BACKGROUND

A variety of battery pack generate power from multiple interconnected batteries. These battery pack employ a holder to hold the batteries in position relative to one another. The batteries and holder are then positioned in a case for the battery pack along with other components such as cooling plates, electrical adapters, and other electronics. Since the case, holder, and other components take up space, these battery packs can be associated with an undesirably low energy density. As a result, there is a need for an improved battery pack.

SUMMARY

The battery pack includes a case that contains batteries and includes terminals through which power from the batteries can be accessed. The battery pack also includes a frame that defines battery receiving compartments that are each configured to receive one of the batteries with the frame immobilizing the position of each battery relative to the other batteries. The frame has a perimeter and at a portion of the frame perimeter serves as an outermost wall of the case. In some instances, the portion of the frame perimeter that serves as an outermost wall of the case frame has a height that is within 80%-120% of the height of the batteries. Additionally or alternately, the frame can be constructed in accordance with an injection molding process.

Another example of the battery pack includes a case that contains multiple sub-packs. Each sub-pack includes parallel groups and series groups. Each series group includes batteries connected in series. Each parallel group includes batteries connected in parallel. Additionally, each parallel group includes one of the batteries from each of the series groups. The battery pack also includes an electrical connector that includes electrical terminals. The electrical connector is configured to be removably coupled with a second electrical connector such that the electrical terminals come into electrical contact with second terminals included in the second electrical connector. A first portion of the sub-packs are in electrical communication with a first portion of the terminals in the electrical connector. A second portion of the sub-packs are in electrical communication with a second portion of the terminals in the electrical connectors. The second portion of the terminals excludes all of the terminals included in the first portion of the terminals.

BRIEF DESCRIPTION OF THE FIGURES

FIG. 3A and FIG. 3B illustrate different types of connectors suitable for with the a battery having the schematic of FIG. 3A.

DESCRIPTION

The battery pack includes a case that contains batteries and includes terminals through which power from the batteries can be accessed. The battery pack also includes a frame that defines battery receiving compartments that are each configured to receive one of the batteries with the frame immobilizing the position of each battery relative to the other batteries. The frame has a perimeter and at a portion of the frame perimeter serves as an outermost wall of the case. Since a portion of a frame that holds the batteries also serves as the outermost walls of the case, these components are not duplicated and the weight of the battery pack is reduced. Accordingly, this construction increases the energy density of the battery pack.

In some instances, the battery pack includes a case that contains multiple sub-packs. Each sub-pack includes batteries arranged in parallel groups and series groups. The battery pack also includes an electrical connector that includes electrical terminals. The electrical connector is configured to be removably coupled with a second electrical connector that is configured to operate with or on power provided by the batteries. A first portion of the sub-packs are in electrical communication with a first portion of the terminals and a second portion of the sub-packs are in electrical communication with a second portion of the terminals. The above battery pack can be included in a system that includes a plurality of second electrical connectors that are different from one another. The second electrical connectors can be employed to operate from or on electrical power provided by the batteries, however, different second electrical connectors can be configured to provide different electrical connections between the terminals. For instance, one of the electrical connectors can connect the sub-packs in parallel and another one of the electrical connectors can connect the sub-packs in series. Connecting the sub-packs results in the battery pack providing a higher voltage than connecting the sub-packs in parallel. As a result, the structure of the electrical connector allows the battery pack to provide power to second electrical connectors that operate using different voltages levels.

Figure 1A:
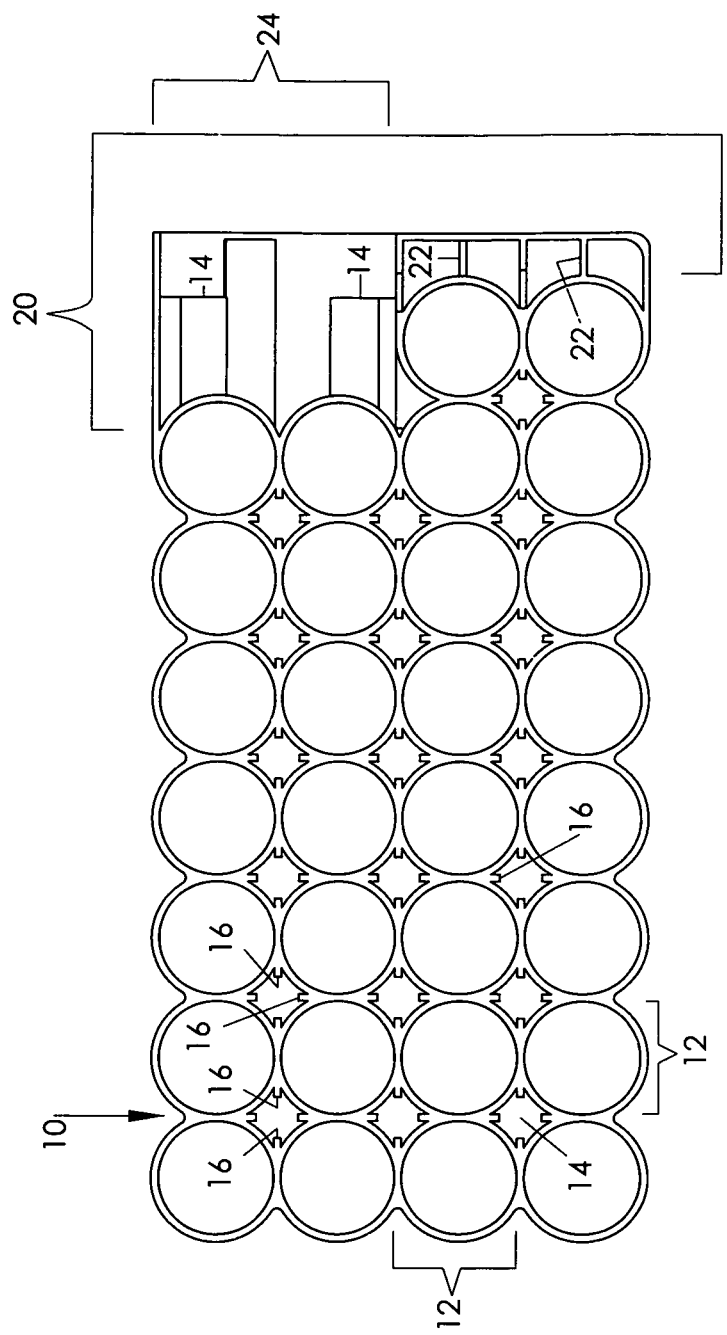
FIG. 1A is a topview of a holder.
Figure 1B:
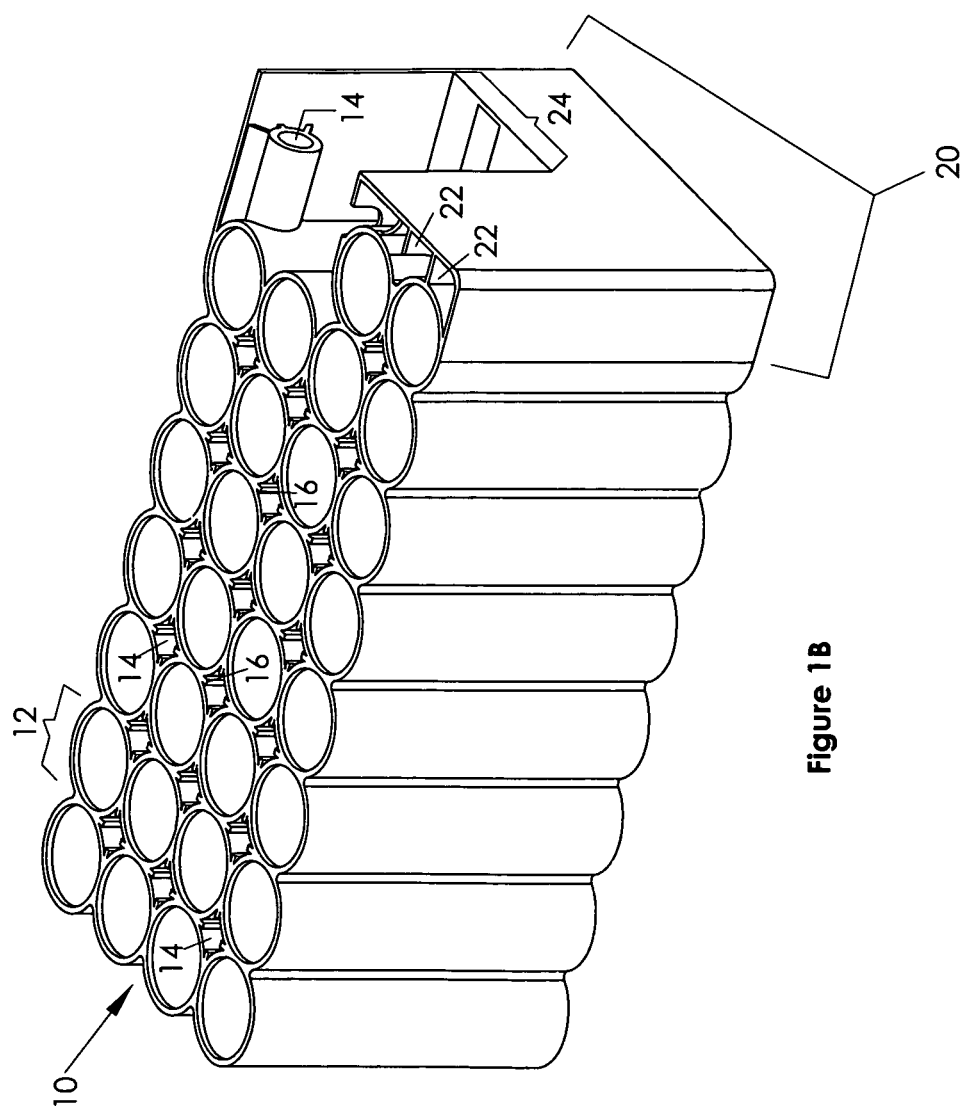
FIG. 1B is a perspective view of the holder shown in FIG. 1A.

FIG. 1A is a topview of a holder. FIG. 1B is a perspective view of the holder shown in FIG. 1A. The holder includes a frame 10 having compartment sections 12 that each defines a battery holding compartment. As will become evident below, each battery holding compartment is sized to receive and hold a battery (not shown). The frame 10 holds the batteries so the batteries are substantially immobilized relative to one another.

The frame 10 can optionally include insert spaces 14 between different portions of the frame 10. For instance, the frame 10 illustrated in FIG. 1A and FIG. 1B has insert spaces 14 between adjacent compartment sections 12. Each insert space 14 includes insert holders 16 that each extends from the compartment section 12 into one of the insert spaces 14. As will be shown in more detail below, an insert can be placed in each insert space 14. A screw or other fastener can then be inserted into an insert in order to fasten other components of the battery pack to the frame 10.

The frame 10 can optionally include other spaces between different portions of the frame 10. For instance, a frame such as the frame 10 illustrated in FIG. 1A and FIG. 1B can have insert spaces 14 that exclude the insert holders 16. In the final battery pack, these spaces can be empty, or filled with a solid, liquid, or gas such as air.

The compartment sections 12 can define the perimeter of the frame 10. The perimeter of the frame 10 can optionally include one or more perimeter regions 20 that are not included in any of the compartment section 12. When the frame 10 includes perimeter regions 20, the frame 10 can optionally include supports 22 that extend between a compartment section 12 of the frame 10 and the perimeter region 20. The supports 22 can provide strength to the frame 10 and can provide additional stability of the battery positions relative to one another.

The frame 10 can also define a component compartment 24. The component compartment 24 can be used to receive other components for the battery pack. Examples of other components include, but are not limited to, electronics such as wires, plugs, plug adapters, plug ports, electronic controllers, and integrated circuit boards. As will become evident below, the frame 10 can also define one or more insert spaces 14 in the component compartment 24. As will be shown below, the insert spaces 14 can be used to immobilize one or more components in the component compartment 24 relative to the frame 10.

The frame 10 can be constructed of materials such as polymers and plastics such as thermoplastics and thermosetting plastics. As a result, the frame 10 can be formed using an injection molding process. Injection molding is a manufacturing process for producing parts from thermoplastic and/or thermosetting plastic materials. In an example of the injection molding process, plastic granules are fed into a heated barrel, mixed, and forced into a mold cavity where it cools and hardens to the configuration of the mold cavity. The ability to use injection molded materials for the frame 10 can reduce the costs and weight associated with the frame 10.

Figure 2A:
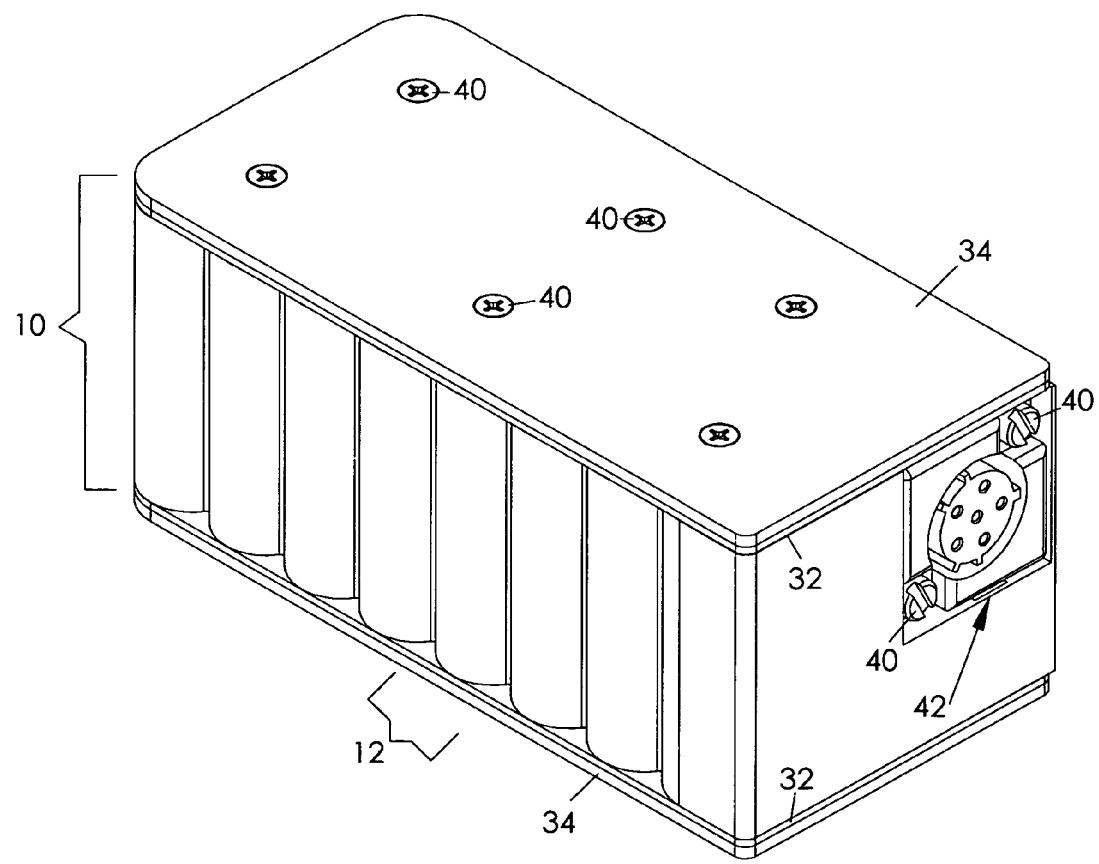
FIG. 2A is a perspective view of a battery pack including the holder of FIG. 1A and FIG. 1B.
Figure 2B:
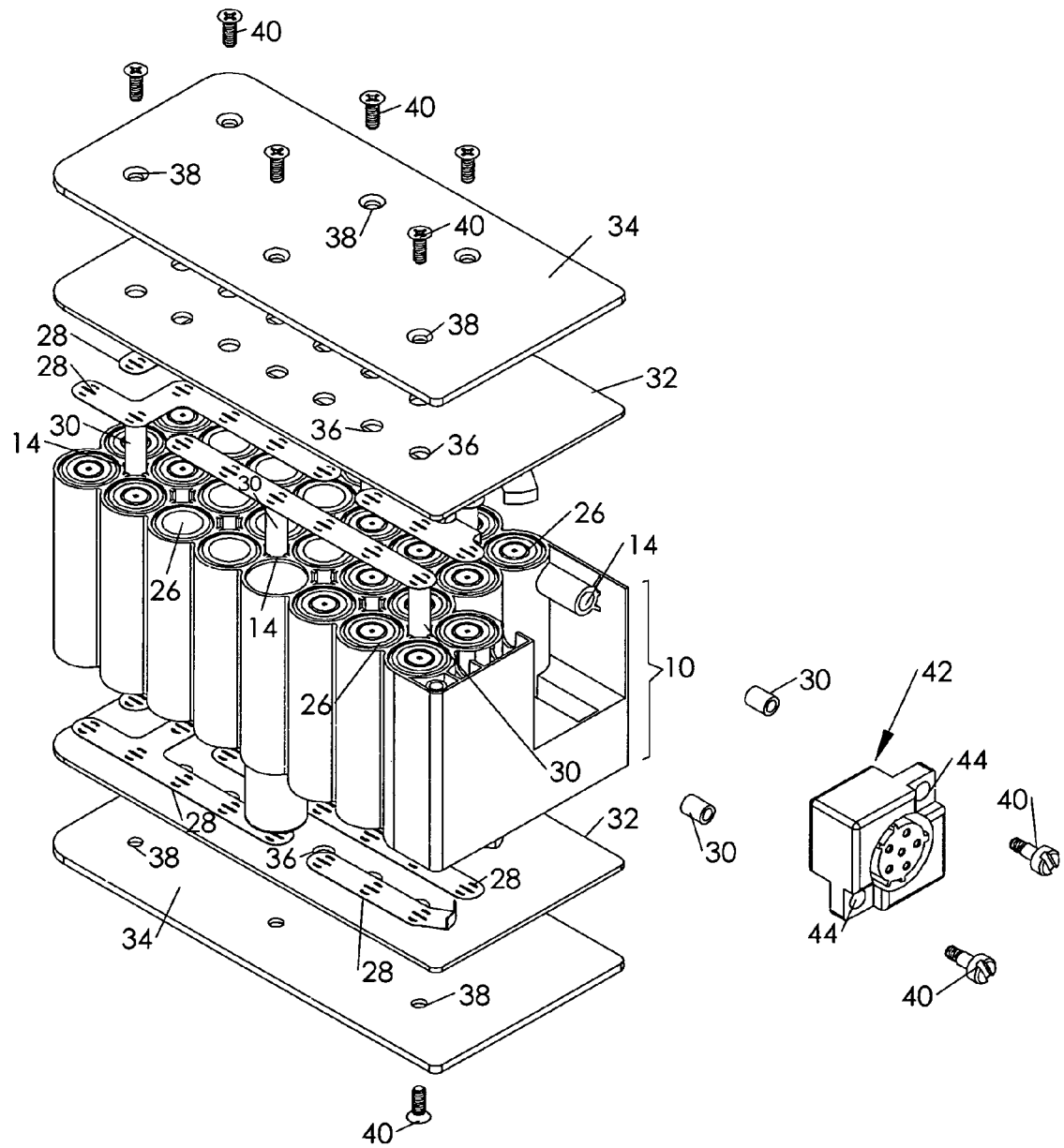
FIG. 2B is an exploded view of the battery pack shown in FIG. 2A.

FIG. 2A is a perspective view of the battery pack. FIG. 2B is an exploded view of the battery pack shown in FIG. 2A. Batteries 26 are received in the battery holding compartments with the compartment sections 12 of the frame 10 surrounding each one of the batteries 26. The frame 10 can optionally be in direct contact with the case of each battery 26. The batteries 26 can all be received in the compartment sections 12 with the same orientation. Alternately, as shown in FIG. 2B, the batteries 26 can be received in the compartment sections 12 with different orientations.

Electrical conductors 28 can be attached to the terminals of the batteries 26 so as to provide electrical communication between the batteries 26 and the electrical conductors 28. An electrical conductor 28 can be in electrical communication with more than one battery 26. As a result, an electrical conductor 28 can provide electrical communication between the batteries 26. Electrical conductors 28 can be attached to the terminals on the tops of the batteries 26 and also on the bottom of the batteries 26. For instance, FIG. 2B illustrates the battery pack including electrical conductors 28 that are attached only to terminals on the top of the batteries 26 and also electrical conductors 28 that are attached only to terminals on the bottoms of the batteries 26.

The electrical conductors 28 can have a tab shape. The electrical conductors 28 can be resistance welded to a terminal of a battery 26. In some instances, the electrical conductors 28 have a tab shape and various locations along the tab are each welded to the battery terminals. The tabs can be formed by chemically etching the tabs from a sheet of an electrically conducting material. Suitable materials for the tab include, but are not limited to, metals such as nickel.

Inserts 30 can be positioned in each of the insert spaces 14 or in a portion of the insert spaces 14. Each insert 30 is configured to receive a fastener 40 such as a screw. For instance, the insert 30 can include a hole into which a screw can be screwed. In some instances, the insert 30 is configured to expand upon receiving the fastener 40. The expansion of the insert 30 can help to immobilize the insert 30 in the insert space 14. Suitable materials for the insert 30 include, but are not limited to, aluminum, graphite, and titanium.

Although inserts 30 are only shown received in the top of the frame 10 of FIG. 2B, there can also be inserts 30 received in the bottom of the frame 10 of FIG. 2B. Accordingly, more than one insert 30 can be received in an insert space 14. Alternately, a single insert 30 can extend from about the bottom of the insert space 14 to the top of the insert space 14. In some instances, an insert 30 that extends from about the bottom of the insert space 14 to the top of the insert space 14 is configured to receive a fastener 40 in the bottom of the insert 30 and in the top of the insert 30.

The battery pack includes electrical insulators 32. Each insulator 32 is positioned between the batteries 26 and a cover 34. As evident from FIG. 2A, the cover 34 serves as a cover for the case. The electrical insulator 32 is shaped so as to electrically insulate the cover 34 from the batteries 26. As is evident from FIG. 2B, the insulator 32 electrically insulates a plurality of the batteries 26 from the cover 34. A suitable electrical insulator 32 includes, but is not limited to, a ceramic such as alumina.

Each electrical insulator 32 includes openings 36 extending through the insulator 32. Each cover 34 includes openings 38 extending through the cover 34. When an electrical insulator 32 and the associated cover 34 a positioned on the battery pack, the openings 36 in the electrical insulator 32 align with the openings 38 in the cover 34. Additionally, the openings 38 in the cover 34 and the electrical insulator 32 also align with the inserts 30. As a result, a fastener 40 can be inserted through the openings and into one of the inserts 30. A clamping portion of the fastener 40 can extend across the opening 38 through the cover 34 such that the clamping portion of the fastener 40 cannot pass through the opening 38 in the cover 34. For instance, the fastener 40 can be a screw with a head sized such that the head cannot pass through the opening 38 in the cover 34. As a result, the fastener 40 can be received in the insert 30 such that the fastener 40 immobilizes the cover 34 relative to the frame 10. For instance, when a fastener 40 is a screw, the screw can be tightened in the insert 30 until the cover 34 is held tightly against the frame 10, inserts 30, electrical conductors 28, and/or the batteries 26.

Inserts 30 can also be received in the insert spaces 14 in the component compartment 24. Each insert 30 is configured to receive a fastener 40 such as a screw. For instance, the insert 30 can include a hole into which a screw can be screwed. In some instances, the insert 30 is configured to expand upon receiving the fastener 40. The expansion of the insert 30 can help to immobilize the insert 30 in the insert space 14. Suitable materials for the insert 30 include, but are not limited to, aluminum, graphite, and titanium.

An electrical connector 42 can be positioned in the component compartment 24. The electrical connector 42 acts as a port through which the power generated within the battery pack can be accessed from outside of the battery pack. For instance, the electrical connector 42 is configured to be mated with a second electrical component such as a second electrical connector. The second electrical component can be configured to extract the electrical energy from with the battery pack through the electrical connector 42.

The electrical connector 42 includes terminals (not shown). Upon mating of the electrical connector 42 with the second electrical component, the terminals in the electrical connector 42 come into contact with terminals in the second electrical component. The electrical connector 42 can include male terminals and/or terminals included in female ports.

The electrical connector 42 includes openings 44 extending through the electrical connector 42. Upon placement of the electrical connector 42 into the component compartment 24, the openings 44 through the electrical connector 42 align with the inserts 30 and the insert spaces 14. As a result, a fastener 40 can be inserted through the openings 44 and into one of the inserts 30. A clamping portion of the fastener 40 can extend across the openings 44 through the electrical connector 42 such that the clamping portion of the fastener 40 cannot pass through the openings 44 through the electrical connector 42. The fastener 40 can be a screw with a head sized such that the head cannot pass through the openings 44 through the electrical connector 42. As a result, the fastener 40 can be received in the insert 30 such that the fastener 40 immobilizes the electrical connector 42 relative to the frame 10. For instance, when a fastener 40 is a screw, the screw can be tightened in the insert 30 until the electrical connector 42 is held tightly relative to the frame 10, and/or the inserts 30.

The terminals in the electrical connector 42 can each be in electrical communication with one or more of the electrical conductors 28. For instance, the battery pack can include wires (not shown) in electrical communication with the terminals in the electrical connector 42 and also in electrical communication with the one or more of the electrical conductors 28. For instance, in order to achieve this electrical communication, a wire can be soldered or welded to a tab portion of the electrical conductor 28 labeled EC in FIG. 2B. The wire can also be connected directly to the terminal on the electrical connector 42. Alternately, the wire can be connected to a second terminal on the electrical connector 42 that is electrically connected to the terminal in the electrical connector 42. The battery pack can include the number of wires needed to achieve the desired number of electrical connections. In some instances, these wires are partially or entirely stored in the component compartment 24.

The inserts 30 are optional. For instance, the frame 10 itself can be configured to receive the fasteners 40. However, as noted above, the frame 10 can be constructed of an injection molded material. In some instances, an insert 30 can provide a stronger attachment of the cover 34 relative to the frame 10 than be achieved when a fastener 40 is received directly into injection molded materials. As a result, the use of inserts 30 may be preferable when the frame 10 is constructed of an injection molded material such as a plastic or polymer.

The frame 10 illustrated in FIG. 1A and FIG. 1B serves as a portion of the case for the battery pack of FIG. 2A and FIG. 2B. For instance, the frame 10 illustrated in FIG. 1A and FIG. 1B defines the outermost lateral sidewalls of the case. For instance, certain portions of the frame 10 define the outermost sidewalls of the case. As an example, the perimeter of the frame 10 defines the outermost lateral sidewalls of the case.

The portions of the frame 10 that define the outermost lateral case wall can be about the same height as the batteries 26 in order to reduce or eliminate a gap between the frame 10 and the cover 34. As a result in some instances, each cover 34 contacts the frame 10 and in some instances, there is a gap between each cover 34 and the frame 10. For instance, the portions of the frame 10 that define the case wall can have a height that is greater than 80% of the height of at least a portion or all of the batteries 26, greater than 90% of the height of at least a portion or all of the batteries 26, greater than 95% of the height of at least a portion or all of the batteries 26, and/or less than 105% of the height of at least a portion or all of the batteries 26, less than 110% of the height of at least a portion or all of the batteries 26, or less than 120% of the height of at least a portion or all of the batteries 26.

As is evident from the above discussion, the portions of the frame 10 that define the outermost lateral case wall can reflect the shape of the underlying batteries 26. For instance, shape of the batteries 26 underlying this portion of the frame 10 can be carried through the frame 10. As an example, the outermost surface of the frame 10 shown in FIG. 1A through FIG. 2B includes semi-circles that are each concentric with the underlying battery 26. This characteristic can be a result of the thickness of the frame 10 being substantially constant around the batteries 26. This feature can reduce the weight of the frame 10 and accordingly the weight of the battery pack.

The portions of the frame 10 that do not define the outermost walls of the case can have a height that is different from the portions of the frame 10 that do define the walls of the case. For instance, portions of the frame 10 that do not define the walls of the case can be shorter than the portions of the frame 10 that do define the walls of the case. In particular, the portions of the frame 10 that define the battery holding compartments but are not included in the perimeter of the frame 10 can be shorter than the portions of the frame 10 that define the battery holding compartments but are included in the perimeter of the frame 10. Having these portions of the frame 10 shorter than portions of the frame 10 perimeter can provide a space for the electrical conductors 28 to be positioned between the frame 10 and the electrical insulator 32 and/or between the frame 10 and the cover 34. Alternately, the top and/or bottom of the frame 10 can include a recess. The electrical conductors 28 can be positioned in these recesses at the locations where the electrical conductor 28 cross the frame 10. As a result, these recesses provide a space for the electrical conductors 28 to pass between the frame 10 and the electrical insulator 32 and/or between the frame 10 and the cover 34.

As evident from FIG. 2A, each cover 34 defines at least a portion of an outermost wall of the case. In the example shown in FIG. 2A, one cover 34 defines an entire one of the outermost walls of the case and the other cover 34 defines another one of the outermost walls of the case. One or more of the covers 34 can be thermally conductive. For instance, the cover 34 can be constructed of materials including, but not limited to, polyethylene, polypropylene, graphite and metals such as aluminum, titanium, and stainless steel. The thermal conductivity of the cover 34 plus the close proximity of the cover 34 and the batteries 26 allows the cover 34 to dissipate heat generated by the batteries 26 during the charging and/or discharging of the battery pack. The heat can be conducted to a cover 34 through the electrical insulator 32 since the electrical insulator 32 can be in contact with both the cover 34 and the batteries 26 and/or electrical conductors 28. Additionally or alternately, in some instances, heat can be conducted to a cover 34 through the fasteners 40.

Figure 3A:
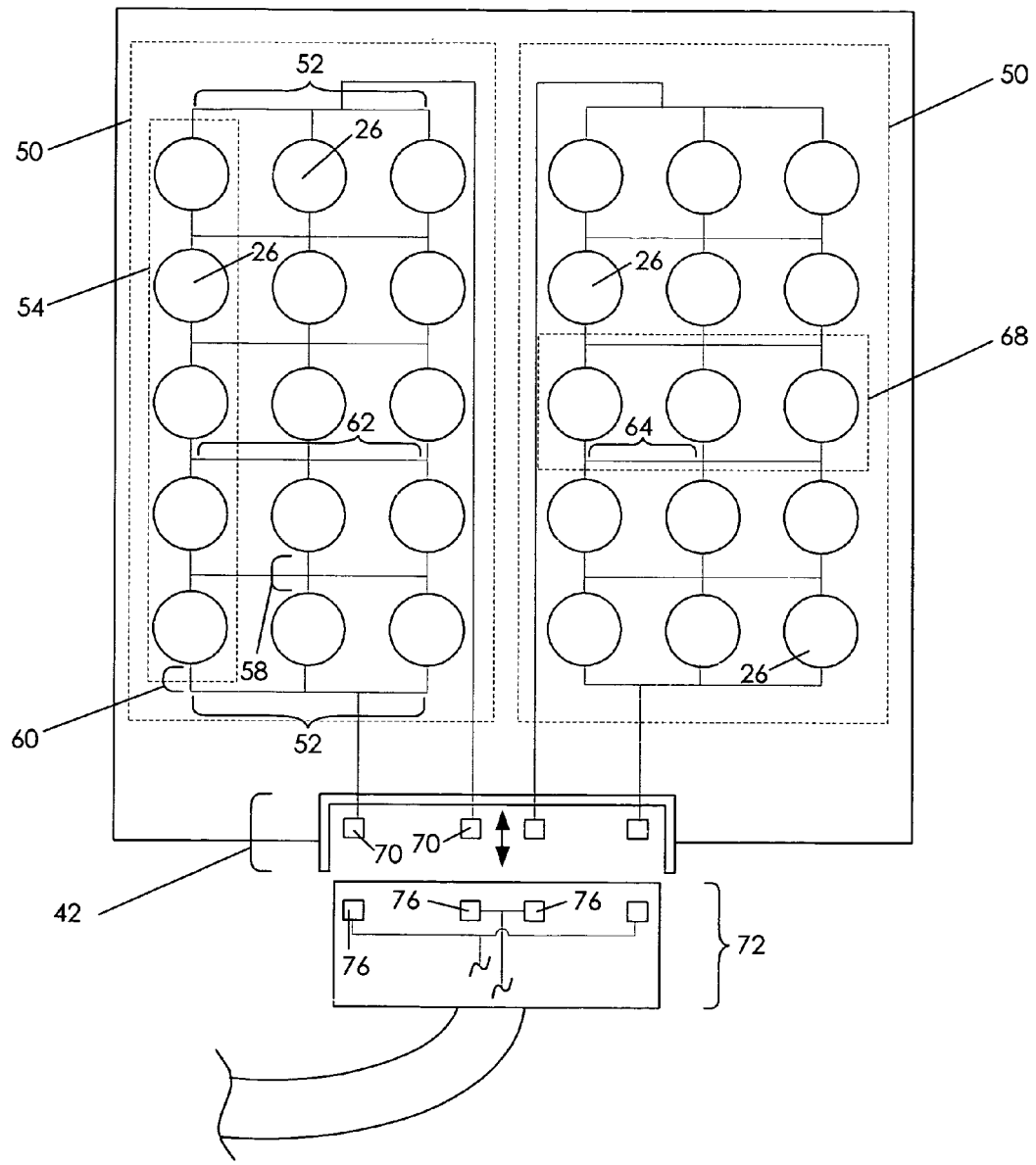
FIG. 3A is a schematic illustrating the electrical connections in a battery pack constructed according to FIG. 1A through FIG. 2B.

FIG. 3A is a schematic illustrating the electrical connections in a battery pack constructed according to FIG. 1A through FIG. 2B. The battery pack includes two sub-packs 50 positioned in the case. Each sub-pack 50 includes two primary parallel lines 52 that connect three series groups 54 in parallel. The series groups 54 each include five batteries 26 connected in series. Secondary series lines 58 provide electrical communication between the batteries 26 connected in series and primary series lines 60 each provide electrical communication between a series group 54 and a primary parallel line 52.

The sub-pack 50 also includes a plurality of secondary parallel lines 62. The secondary parallel lines 62 each include one or more cross lines 64 that provide electrical communication between secondary series lines 58 in different series groups 54. Accordingly, each secondary parallel line 62 provides a parallel connection between the batteries 26 in different series group 54. For instance, each secondary parallel line 62 provides electrical communication between different series groups 54 such that a battery 26 in one of the series groups 54 is connected in parallel with a battery 26 in the other series groups 54. Because a single secondary parallel line 62 only provides one of the parallel connections, another connection is needed to connect batteries 26 in parallel. The other parallel connection can be provided by another secondary parallel line 62 or by a primary parallel line 52.

The electrical conductors 28 shown in FIG. 2B serve as the primary parallel lines, the primary series lines, the secondary parallel lines and the secondary series lines shown in FIG. 3A. For instance, the single electrical conductor 28 labeled P1 serves as both a primary parallel line and the associated primary series lines. Further, the single electrical conductor 28 labeled P2 serves as both secondary primary parallel lines and the associated secondary series lines.

Each of the batteries 26 connected in parallel belongs to a parallel group 68. Accordingly, the sub-packs 50 shown in FIG. 3A includes five parallel groups 68. As a result, each sub-pack 50 includes a plurality of parallel groups connected in series. In some instances, each parallel group includes one battery 26 from each one of the series groups as illustrated in FIG. 3A.

Although each sub-pack 50 is shown as having five parallel groups, the sub-packs 50 can have a different number of parallel groups. For instance, the sub-packs 50 can each have two or more parallel groups, one parallel group, or no parallel groups. Although each sub-pack 50 is shown as having three series groups, the sub-packs 50 can have a different number of series groups. For instance, the sub-packs 50 can each have two or more series groups, one series group, or no series groups. In some instance, each sub-pack 50 includes a single battery 26.

Each of the primary parallel lines is in electrical communication with a terminal 70 in the electrical connector 42. As discussed above, the electrical communication between the electrical conductors 28 shown in FIG. 2B and the terminals 70 in the electrical connector 42 can be provided by wires.

Figure 3B:
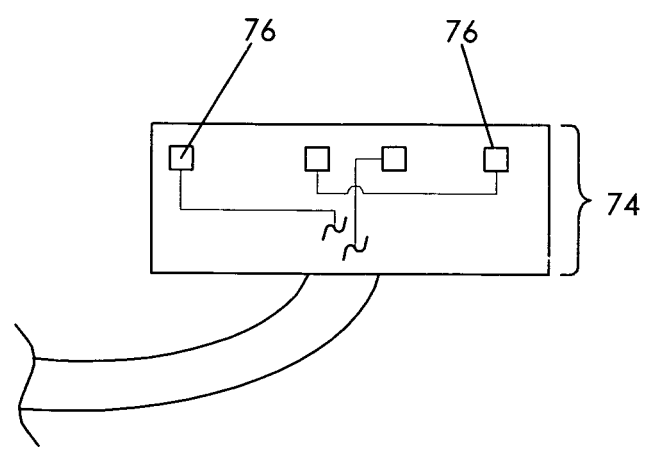

The battery pack can be included in a system that includes a plurality of second electrical components that are different from one another. For instance, FIG. 3A illustrates a first type of second electrical component 72 and FIG. 3B illustrates a second type of second electrical component 74. The battery pack can be included in a system that includes the first type of second electrical component 72 and the second type of second electrical component 74.

The second electrical components shown in FIG. 3A and FIG. 3B are configured to be detachably mated with the electrical connector 42. Each of the second electrical components includes terminals 76. Upon mating of the second electrical component with the electrical connector 42, the terminals 70 in the electrical connector 42 are placed in electrical communication with the terminals 76 in the second electrical component.

The second electrical component illustrated in FIG. 3A includes electronics that connect the sub-packs 50 in parallel. As a result, if each sub-pack 50 is configured to output 12 V, the second electrical component can operates from, with, and/or on 12V. In contrast, the second electrical component illustrated in FIG. 3B includes electronics that connect the sub-packs 50 in series. As a result, if each sub-pack 50 is configured to output 12 V, the second electrical component operates from, with, and/or on 24V. As a result, the structure of the electrical connector 42 allows the battery pack to provide power to second electrical components that operate using different voltages levels.

The second electrical component illustrated in FIG. 3A and FIG. 3B is a plug that is configured to be mated with the electrical connector 42 on the battery pack. Such plugs can have the structures of male and female connectors. For instance, a first one of the plugs can have the structure of a male plug or male adapter and the mating plug can have the structure of a female plug or female adapter configured to receive all or a portion of the first plug.

Although the second electrical component illustrated in FIG. 3A and FIG. 3B is a plug, the illustrated plug can be included in a device that is plugged directly into the electrical connector 42 included in the battery pack or into which the electrical connector 42 in the battery pack can be plugged.

Although the battery pack is illustrated as including two sub-packs 50. The battery pack can be modified to include more sub-packs 50 or only one sub-pack 50. Each sub-pack 50 can be independently connected to terminals 70 in the electrical connector 42. Alternately, one or more of the sub-packs 50 can be electrically connected before being electrically connected to terminals 70 in the electrical connector 42. For instance, sub-packs 50 included in the battery pack can be connected in parallel and/or in series and the result can then be electrically connected to terminals 70 in the electrical connector 42. These arrangements permit the battery pack to provide power to second electrical components that operate using more than two different voltages levels or that all use a single voltage level.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A battery pack, comprising:
   a case that contains multiple sub-packs, each sub-pack including parallel groups and series groups,
      each series group including batteries connected in series,
      each parallel group including batteries connected in parallel,
      each parallel group including one of the batteries from each of the series groups;
   an electrical connector that includes electrical terminals, the electrical connector configured to be removably coupled with a second electrical connector such that the electrical terminals come into electrical contact with second terminals included in the second electrical connector,
      when the electrical connector is not coupled with the second electrical connector a first portion of the sub-packs being in electrical communication with a first portion of the terminals in the electrical connector and a second portion of the sub-packs being in electrical communication with a second portion of the terminals in the electrical connector,
      the second portion of the terminals excluding the terminals included in the first portion of the terminals;

a frame defining battery receiving compartments that are each configured to receive one of the batteries such that the frame immobilizes a position of each battery relative to the other batteries, the frame includes frame openings:

inserts arranged such that one of the inserts is positioned in each frame opening;

a first metal plate is positioned over the batteries, the metal plate includes openings through the metal plate; and fasteners that each extends through one of the opening through the metal plate and into one of the inserts.

2. The battery pack of claim 1, wherein the first portion of the terminals includes two or more terminals in the electrical connector and the second portion of the terminals includes two or more terminals in the electrical connector.

3. The battery pack of claim 1, further comprising:

second electrical connectors, a first one of the second electrical connectors including electronics that connect two or more of the sub-packs in parallel, and a second one of the second electrical connectors including electronics that connect two or more of the sub-packs in series.

4. The battery pack of claim 1, further comprising:

a case that contains the batteries and includes terminals through which power from the batteries can be accessed.

5. The battery pack of claim 1, wherein the frame has a perimeter and a portion of the frame perimeter serving as an outermost wall of the case, and the frame has a height that is within 80%-120% of the height of the batteries.

6. The battery pack of claim 5, wherein the frame has a height that is within 80% to 120% of a height of at least one of the batteries.

7. The battery pack of claim 5, wherein the frame is constructed in accordance with an injection molding process.

8. The battery pack of claim 7, wherein the frame consists of a polymer.

9. The battery pack of claim 7, wherein the frame consists of a plastic.

10. The battery pack of claim 7, wherein the battery receiving compartments each surrounds a battery received in the battery receiving compartment.

11. The battery pack of claim 1, wherein a second metal plate is under the batteries and serves as a cover for the case in that the metal plate is the lowermost layer of the case.

12. The battery pack of claim 1, further comprising:

an electrical insulator electrically insulating the metal plate from the batteries.

13. The battery pack of claim 1, wherein the frame is constructed in accordance with an injection molding process.

14. A battery pack, comprising:

a case that contains batteries; and a frame defining battery receiving compartments that are each configured to receive one of the batteries such that the frame immobilizes a position of each battery relative to the other batteries, a first metal plate positioned over the batteries, the frame includes frame openings, an insert is positioned in each frame opening, the metal plate include openings through the metal plate, and fasteners that each extends through one of the opening through the metal plate and into one of the inserts.

15. The battery pack of claim 1, wherein when the electrical connector is not coupled with the second electrical connector the first portion of the sub-packs are in electrical communication with the first portion of the terminals but not in electrical communication with the second portion of the terminals and the second portion of the sub-packs is in electrical communication with the second portion of the terminals but not in electrical communication with the first portion of the terminals.

16. The battery pack of claim 1, wherein the insert expands in response to the fastener extending into the insert.

17. The battery pack of claim 14, wherein the insert expands in response to the fastener extending into the insert.

18. The battery pack of claim 14, wherein the case includes terminals through which power from the batteries can be accessed.

19. The battery pack of claim 14, wherein the frame is constructed in accordance with an injection molding process.

20. The battery pack of claim 14, wherein the frame has a perimeter and a portion of the frame perimeter serves as an outermost wall of the case.

21. The battery of claim 14, wherein the metal plate serves as a cover for the case in that the metal plate is the uppermost layer of the case.

22. The battery pack of claim 14, wherein the frame has a height that is within 80% to 120% of a height of at least one of the batteries.

23. The battery pack of claim 14, wherein the frame consists of a polymer.

24. The battery pack of claim 14, wherein the frame consists of a plastic.

25. The battery pack of claim 14, wherein the battery receiving compartments each surrounds a battery received in the battery receiving compartment.

26. The battery pack of claim 14, wherein a second metal plate is under the batteries and serves as a cover for the case in that the metal plate is the lowermost layer of the case.

27. The battery pack of claim 14, further comprising:

an electrical insulator electrically insulating the metal plate from the batteries.

* * * * *